United States Patent
Sporrer

[19]

[11] Patent Number: 6,105,463
[45] Date of Patent: Aug. 22, 2000

[54] TRANSMISSION AND TRANSAXLE CASING

[75] Inventor: Ronald Sporrer, Sullivan, Ill.

[73] Assignee: Hydro-Gear Limited Partnership, Sullivan, Ill.

[21] Appl. No.: 08/899,903

[22] Filed: Jul. 24, 1997

[51] Int. Cl.[7] .................................................. F16H 57/02
[52] U.S. Cl. .......................... 74/606 R; 60/487; 475/72
[58] Field of Search ............................ 74/606 R; 60/487,
60/488, 490, 454; 475/72, 206, 74; D15/148,
149, 5

[56] References Cited

U.S. PATENT DOCUMENTS

| | | | |
|---|---|---|---|
| D. 190,883 | 7/1961 | Rhodes | D15/149 |
| D. 339,142 | 9/1993 | Middlebrook | D15/5 |
| 1,988,338 | 1/1935 | Schmitter et al. | 74/606 R X |
| 4,386,742 | 6/1983 | Moss et al. | 242/84.1 R |
| 4,441,378 | 4/1984 | Ponczek | 74/606 R X |
| 4,506,561 | 3/1985 | Hayakawa | 74/606 R |
| 4,867,008 | 9/1989 | Yamaoka et al. | 74/606 R |
| 5,146,748 | 9/1992 | Okada | 60/454 |
| 5,156,576 | 10/1992 | Johnson | 475/72 |
| 5,201,692 | 4/1993 | Johnson et al. | 475/74 |
| 5,314,387 | 5/1994 | Hauser et al. | 475/74 |
| 5,330,394 | 7/1994 | Hauser et al. | 475/230 |
| 5,335,496 | 8/1994 | Azuma et al. | 60/487 |
| 5,613,409 | 3/1997 | Hauser | 74/606 R |
| 5,836,219 | 11/1998 | Klingler et al. | 74/606 R |

FOREIGN PATENT DOCUMENTS

| | | | |
|---|---|---|---|
| 0681 359 A1 | 11/1995 | European Pat. Off. | 74/606 R |
| 681862 | 10/1952 | United Kingdom | 60/487 |

*Primary Examiner*—Vinh T. Luong
*Attorney, Agent, or Firm*—Thomas C. McDonough; John E. Hyatt

[57] ABSTRACT

A casing adapted for use in carrying a transmission or transaxle assembly. The casing includes a main casing section having an opening and a cap disposed over the opening wherein the cap and the main casing section are adapted for snap fit engagement. In a first embodiment, the main casing section has a first lip formed around the perimeter of the opening and the cap has a second lip wherein the first and second lips are adapted for snap fit engagement. In a second embodiment, the main casing section has a lip formed around the perimeter of the opening and the cap comprises a plurality of clips wherein the lip and the plurality of clips are adapted for snap fit engagement.

7 Claims, 11 Drawing Sheets

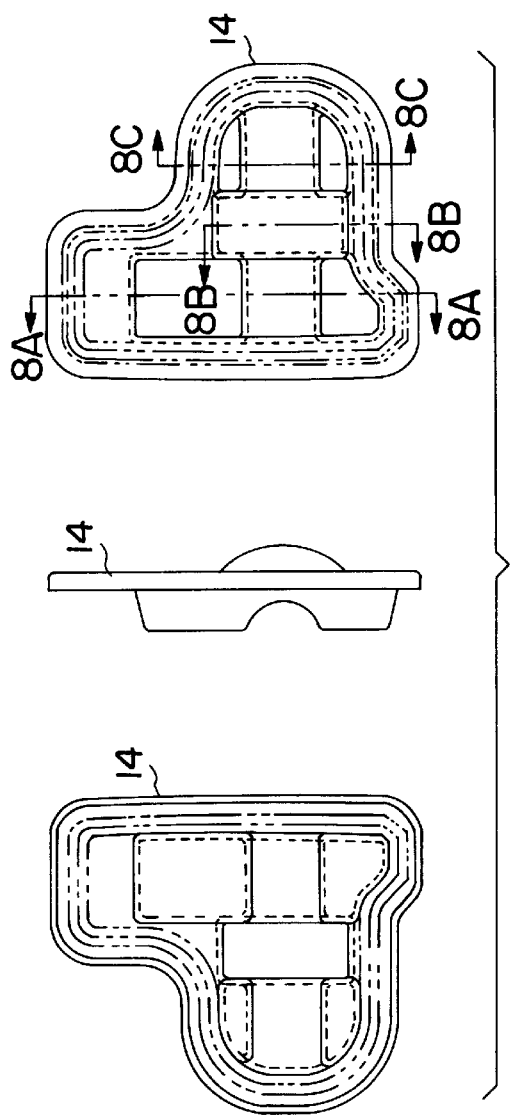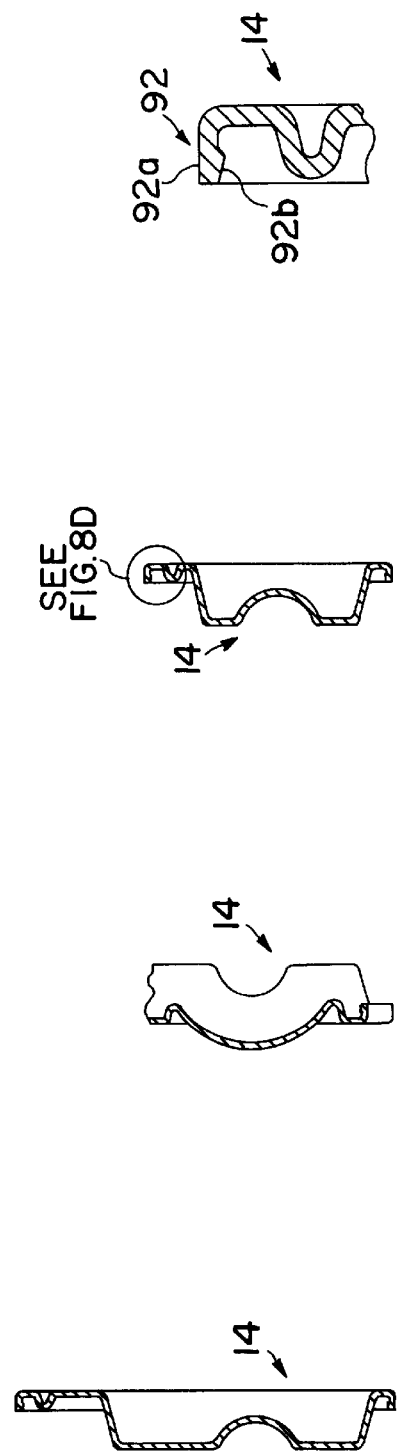

TRANSMISSION AND TRANSAXLE CASING

BACKGROUND OF THE INVENTION

This invention relates generally to transmission and transaxle casings and, more particularly, relates to a fastener less, hydrostatic transmission or transaxle casing.

Transmission and transaxle casings of conventional construction are well known in the art. An example of one such transaxle casing is disclosed in U.S. Pat. No. 5,330,394 to Hauser et al. entitled "Rider Transaxle Having Improved Casing Design." As illustrated by the '394 patent, known transmission and transaxle casings are typically formed by fastening two or more casing components together. More specifically, the casing components are formed with complimentary fastener accepting apertures through which a fastener, such as a bolt or the like, is passed to secure the components in mating engagement.

A further transaxle casing may be seen in U.S. Pat. No. 5,613,409 to Hauser entitled "Axle Driving Apparatus Having Improved Casing Design." In particular, the '409 patent discloses an integrated hydrostatic transaxle ("IHT") having a casing component to which is fastened a cap plate and an axle cap. As with the '394 patent, the casing components are all formed from a metal, such as aluminum, and provided with fastener accepting apertures through which fasteners are passed to secure the casing components in mating engagement.

While the transmission and transaxle casings found in the prior art work well for their intended purpose, such casings are known to have several disadvantages. In particular, forming the casing components with fastener accepting apertures is seen to be a costly process which requires relatively tight manufacturing tolerances, for example, to ensure the proper alignment of the apertures. Furthermore, the process of using fasteners to couple the various casing components is seen to slow and complicate the assembly process resulting in an undesirable increase in the overall cost of manufacture. Additionally, deflection of the casing components of hydrostatic transmissions and transaxles along the junction surfaces will occur in those areas not directly secured with fasteners (those areas between the fasteners) which may result in the leakage of hydraulic fluid therefrom. Such fluid leakage resulting from the noted intermittent attachment between the casing components may impair the operability of the device and is cosmetically and ecologically unappealing.

From the foregoing, it is seen that a need exists for an improved transmission and transaxle casing.

SUMMARY OF THE INVENTION

The present invention resides in a fastener less casing adapted for use in carrying a transmission or transaxle assembly, in particular, a hydrostatic transmission or a hydrostatic transaxle. The casing includes a main casing section having an opening and a cap disposed over the opening wherein the cap and the main casing section are adapted for snap fit engagement. In a first embodiment, the main casing section has a first lip formed around the perimeter of the opening and the cap has a second lip wherein the first and second lips are adapted for snap fit engagement. In a second embodiment, the main casing section has a lip formed around the perimeter of the opening and the cap comprises a plurality of clips wherein the lip and the plurality of clips are adapted for snap fit engagement.

Accordingly, it is an object of the present invention to provide an improved transaxle or transmission casing which overcomes the deficiencies above-noted. More specifically, it is an object of the present invention to provide an improved casing which may be manufactured and assembled at a relative cost savings. It is a further object of the present invention to provide a relatively less costly means for increasing the number of points of attachment between the casing components for the purpose of minimizing the leakage problem resulting from component deflection. It is still a further object of the present invention to provide an embodiment which utilizes "continuous" attachment between the casing components for the purpose of eliminating the leakage problem resulting from component deflection. It is yet a further object of the present invention to provide an improved casing which is relatively lighter than currently known casings. It is a more specific object of the present invention to provide an improved casing which does not require the use of fasteners, i.e., a "fastener less casing".

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the invention, reference may be had to the preferred embodiments shown in the following drawings in which:

FIG. 8 illustrates an embodiment of an end cap for use in connection with the IHTs illustrated in FIGS. 1–4;

FIGS. 8A–8C illustrate cross sectional views of the end cap illustrated in FIG. 8;

DETAILED DESCRIPTION

Figure 1:
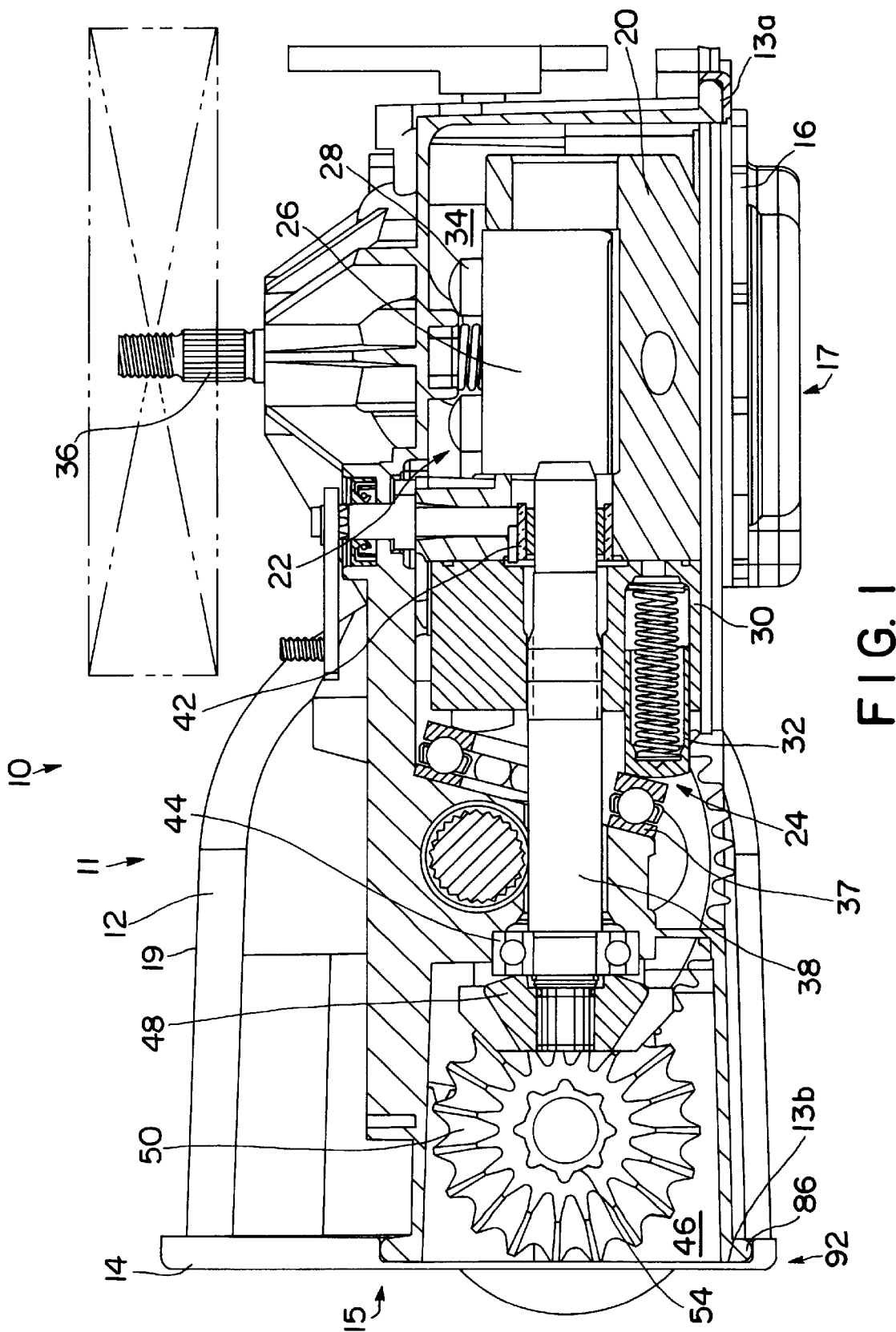
FIG. 1 illustrates a side, partial sectional view of an embodiment of an IHT constructed in accordance with the subject invention.

While the invention can be used in connection with most types of transmissions and transaxles, it will be described hereinafter in the context of a integrated hydrostatic transaxle ("IHT") as the preferred embodiment thereof.

Referring now to the figures, wherein like reference numerals refer to like elements, there is shown in the figures an IHT 10. While a brief description of the general construction and operation of the IHT will follow, the reader is referred to U.S. Pat. Nos. 5,201,692 and 5,314,387, which patents are hereby incorporated by reference in their entirety, for a more thorough discussion of this subject matter.

As illustrated, the IHT 10 includes a casing, also referred to herein as a housing, 11 comprised of a main casing section 12, a first cap or cover 14, and a second cap or cover 16. The main casing section 12 is also referred to as a first casing component 12. Likewise, the first cover 14 is also referred to as a second casing component 14, and the second cover 16 is also referred to as a third casing component 16. In some preferred embodiments, the second casing component 14 is an end cap 14, and the third casing component 16 is a base cap 16. It will be understood that use of designations such as first, second, and third is for convenience only and not limited to the exemplarary embodiment described. For example, the base may indeed be referred to as the second casing component. Accordingly, the invention is defined by the claims, not the exemplarary descriptions. Likewise, the caps may be referred to as first and second aps generally without fixation of the terms "end" or "base" to the "first" and "second" caps. More specifically, the main casing section 12 has a surface 19 defining a first opening and a second opening wherein the first cap 14 is disposed over the first opening 15 and the second cap 16 is disposed over the second opening 17. In the preferred embodiment of the subject invention, best seen in FIGS. 1 and 6, the first and second caps 14, 16 are both adapted to be snap fit to the main casing section 12. However, in an alternative embodiment of the subject invention, not illustrated, the main casing section 12 is provided with fastener accepting apertures while either the first or second caps 14, 16 are similarly provided with complimentary fastener accepting apertures for allowing the main casing section 12 and either the first or second caps 14, 16 to be mated in the conventional manner. In both embodiments, the casing is provided with a substantially horizontal junction line 13a formed by the junction of the main casing section 12 with the second cap 16 and a substantially vertical junction line 13b formed by the junction of the main casing section 12 with the first cap 14. The preferred snap fitting configuration of the casing will be described in greater detail hereinafter.

The IHT 10 further includes a hydrostatic transmission disposed within the hydraulic chamber 34 of the main casing section 12 which may be described as being housed entirely within the main casing section 12 and covered by the second cap 16. The hydrostatic transmission comprises a center section 20 having hydraulic porting formed therein on which are mounted a hydraulic pump unit 22 and a hydraulic motor unit 24. The hydraulic pump unit 22 is hydraulically connected to the hydraulic motor unit 24 through the hydraulic porting formed in the center section 20 to form what is referred to as a hydraulic circuit. The hydraulic pump unit 22 further includes a pump cylinder block 26 having a plurality of piston receiving chambers formed therein in each of which is disposed a movable pump piston 28. Similarly, the hydraulic motor unit 24 includes a motor cylinder block 30 having a plurality of piston receiving chambers formed therein in each of which is disposed a movable motor piston 32.

An input shaft 36, which is driven by the engine of the vehicle (not shown), is drivingly connected to the hydraulic pump unit 22 such that the rotation of the input shaft 36 rotates the pump cylinder block 26 therewith. The rotation of the pump cylinder block 26 causes the pump pistons 28 to travel up and down as they travel against a movable swash plate. As will be understood by those skilled in the art, the swash plate may be moved to a variety of positions to vary the stroke of the pump pistons 28. In particular, as the stroke of the pump pistons 28 is varied, the volume of the hydraulic fluid pumped into the hydraulic porting will vary. Since the speed of the hydraulic motor unit 24 is dependent upon the amount of hydraulic fluid pumped there into by the hydraulic pump unit 22, the positioning of the swash plate is seen to control the speed of the hydraulic motor unit 24. More specifically, each of the motor pistons 32 is driven by the pumped hydraulic fluid against a fixed, angularly orientated motor thrust bearing 37 such that the action of the motor pistons 32 thereagainst forces the motor cylinder block 30 to rotate.

Figure 2:
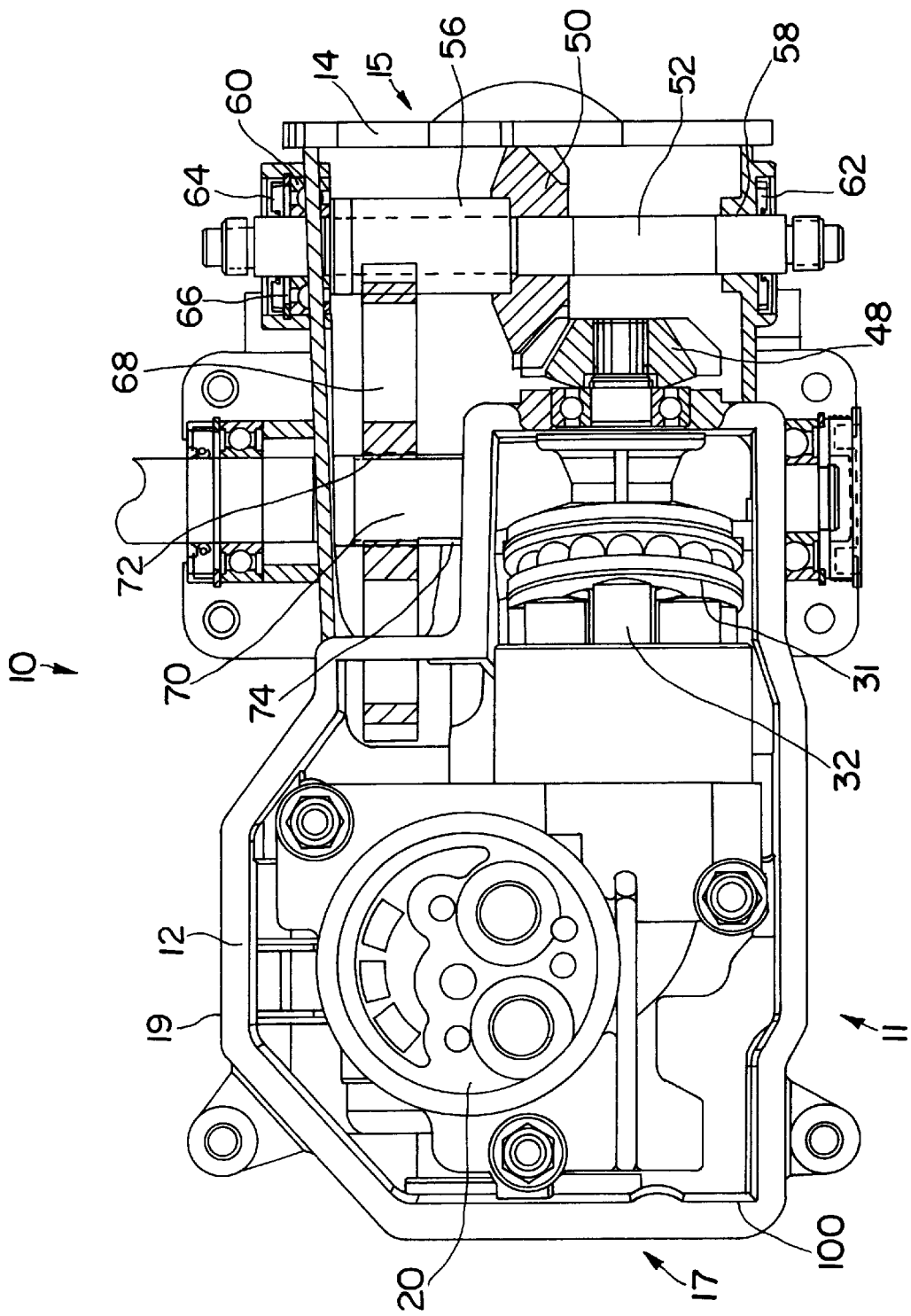
FIG. 2 illustrates a bottom, sectional view of an embodiment of an IHT constructed in accordance with the subject invention.

Drivingly connected to the motor cylinder block 30 is a motor shaft 38 which is arranged and adapted to rotate therewith. In particular, the motor shaft extends into the mechanical chamber 46 of the main casing section 12 which may be described as being housed entirely within the main casing section 12 and covered by the first cap 14. The motor shaft 38 is carried at its proximate end on a bearing 42 associated with the center section 20 and at its distal end on a bearing 44 associated with the main casing section 12. Drivingly connected to the distal end of the motor shaft 38 is a first bevel drive gear 48. The first bevel drive gear 48 is, in turn, drivingly connected to a second bevel gear 50 which is drivingly mounted on a brake shaft 52. More specifically, as illustrated in FIGS. 1 and 2, the inner portion of one end of the second bevel gear 50 is provided with gear teeth 54 which are adapted to mate with gear teeth 56 formed on the brake shaft 52. As illustrated, additional hardware need not be used to retain the bevel gears 48, 50 on the respective shafts as the gear separating forces between the first bevel drive gear 48 and the second bevel gear 50 function to maintain the position of the bevel gears 48,50 thereon and their mating engagement.

The brake shaft 52, on which the second bevel gear 50 is mounted, is preferably carried by the first component 12. In particular, the first component 12 is provided with a first pair of oppositely disposed apertures through which first and second ends of the brake shaft 52 preferably extend. The first aperture has a surface 58 which directly supports the first end of the brake shaft 52 although bearings may be utilized. Meanwhile, a bearing 60 is positioned within the second aperture for supporting the second end of the brake shaft 52. A second bearing is not required within the first aperture owing to the reduced loading experienced by the first end of the brake shaft 52. A first seal 62 is positioned within the first aperture about the first end of the brake shaft 52 while a second seal 64 is positioned in the second aperture, over a retaining ring 66, about the second end of the brake shaft 52. A parking brake mechanism 67, positioned for engagement with one or both of the externally disposed first and second ends of the brake shaft 52, may be provided to prevent the rotation of the brake shaft 52.

A bull gear 68 is further drivingly connected to the gear teeth 56 of the brake shaft 52 which is, in turn, drivingly connected to a reversibly positionable axle shaft 70. In particular, the bull gear 68 is floatingly positioned over the axle shaft 70 and is provided with gear teeth or splines 72 around its inner circumference which are adapted to drivingly mate with gear teeth or splines 74 formed on the axle shaft 70. Preferably, the distal portion 68a of the bull gear 68 is inwardly tapered to prevent the binding of the bull gear 68 against the neighboring walls of the main casing section 12 should the floating nature of the bull gear 68 place the bull gear 68 into engagement therewith. As will be described, the gear teeth 74 formed on the axle shaft 70 in cooperation with a second pair of oppositely disposed apertures formed in the main casing section 12 allow the axle shaft 70 to be reversibly positioned for either a left handed or right handed drive. (Left handed/right handed drive being defined by the direction of the protrusion of the axle shaft from the housing when the orientation of the housing remains constant as illustrated in FIGS. 3 and 4.)

Figure 4:
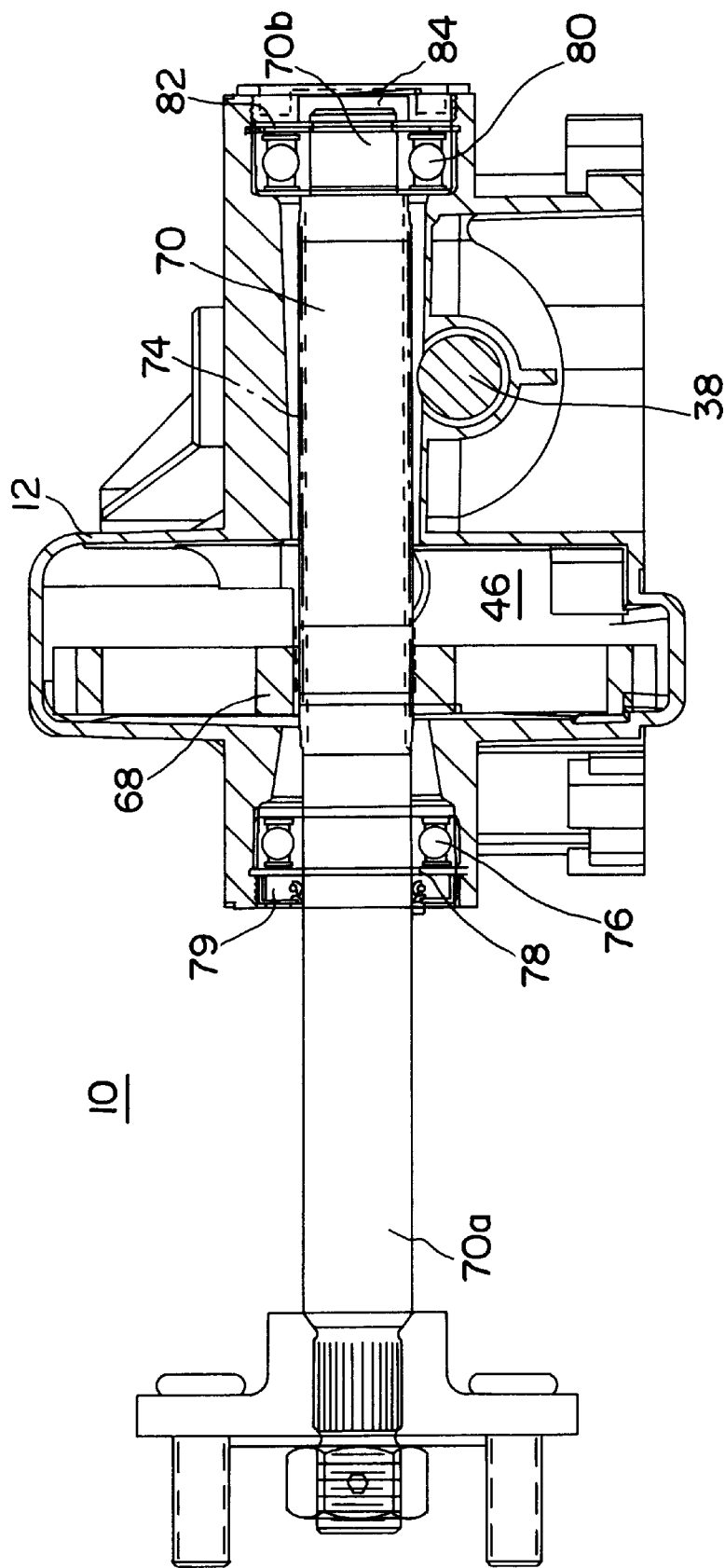
FIG. 4 illustrates a back, sectional view of an embodiment of an IHT constructed in accordance with the subject invention.

For left handed drive, best seen in FIG. 4, the distal end 70a of the axle shaft 70 extends from a third aperture formed in the main casing section 12 while the interior end 70b of the axle shaft 70 is positioned within a fourth aperture. More specifically, the third aperture has positioned therein a bearing 76 which supports the axle shaft 70, a retaining ring 78, and a seal 79 positioned around the axle shaft 70 through which the axle shaft 70 extends. Meanwhile, the fourth aperture similarly has positioned therein a bearing 80 which supports the interior end 70b of the axle shaft 70, a retaining ring 82, and a seal 84 which is adapted to cover the interior end 70b of the axle shaft 70.

Figure 3:
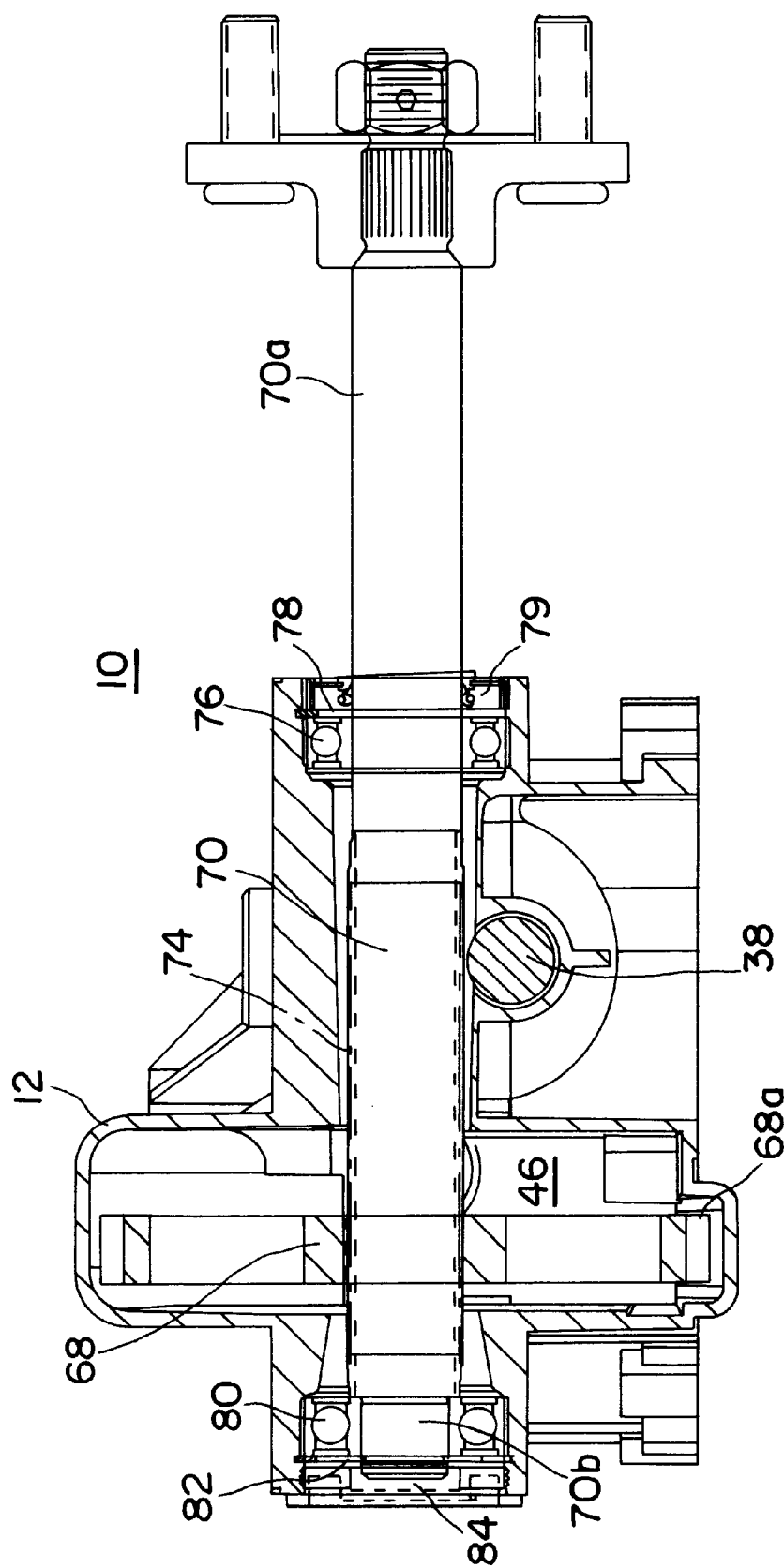
FIG. 3 illustrates a back, sectional view of an embodiment of an IHT constructed in accordance with the subject invention.

For right handed drive, best seen in FIG. 3, the distal end 70a of the axle shaft 70 extends from the fourth aperture formed in the main casing section 12 while the interior end 70b of the axle shaft 70 is positioned within the third aperture. More specifically, the fourth aperture has positioned therein the bearing 76 which supports the axle shaft 70, the retaining ring 78, and the seal 79 positioned around the axle shaft 70 and through which the axle shaft 70 extends. Meanwhile, the third aperture has positioned therein the bearing 80 which supports the interior end 70b of the axle shaft 70, the retaining ring 82, and the seal 84 which is adapted to cover the interior end 70b of the axle shaft 70.

As described above, the use of the reversibly positionable axle shaft 70 allows a single axle shaft to be used for either left handed or right handed drive. For this purpose, the gear teeth 74 of the axle shaft 70 are formed so as to extend along the substantial length of that portion of the axle shaft 70 which is positioned within the mechanical chamber 46 of the main casing section 12. In this manner, the teeth 74 of the axle shaft 70 are ensured of being able to matingly engage with the gear teeth 72 of the bull gear 68 when the axle shaft 70 is positioned in either drive configuration. While the gear teeth 74 are illustrated as extending continuously along this length, it will be understood that other arrangements of the gear teeth are contemplated so long as the axle shaft 70 is capable of being driven by the bull gear 68 when utilized in either drive configuration.

Figure 5:
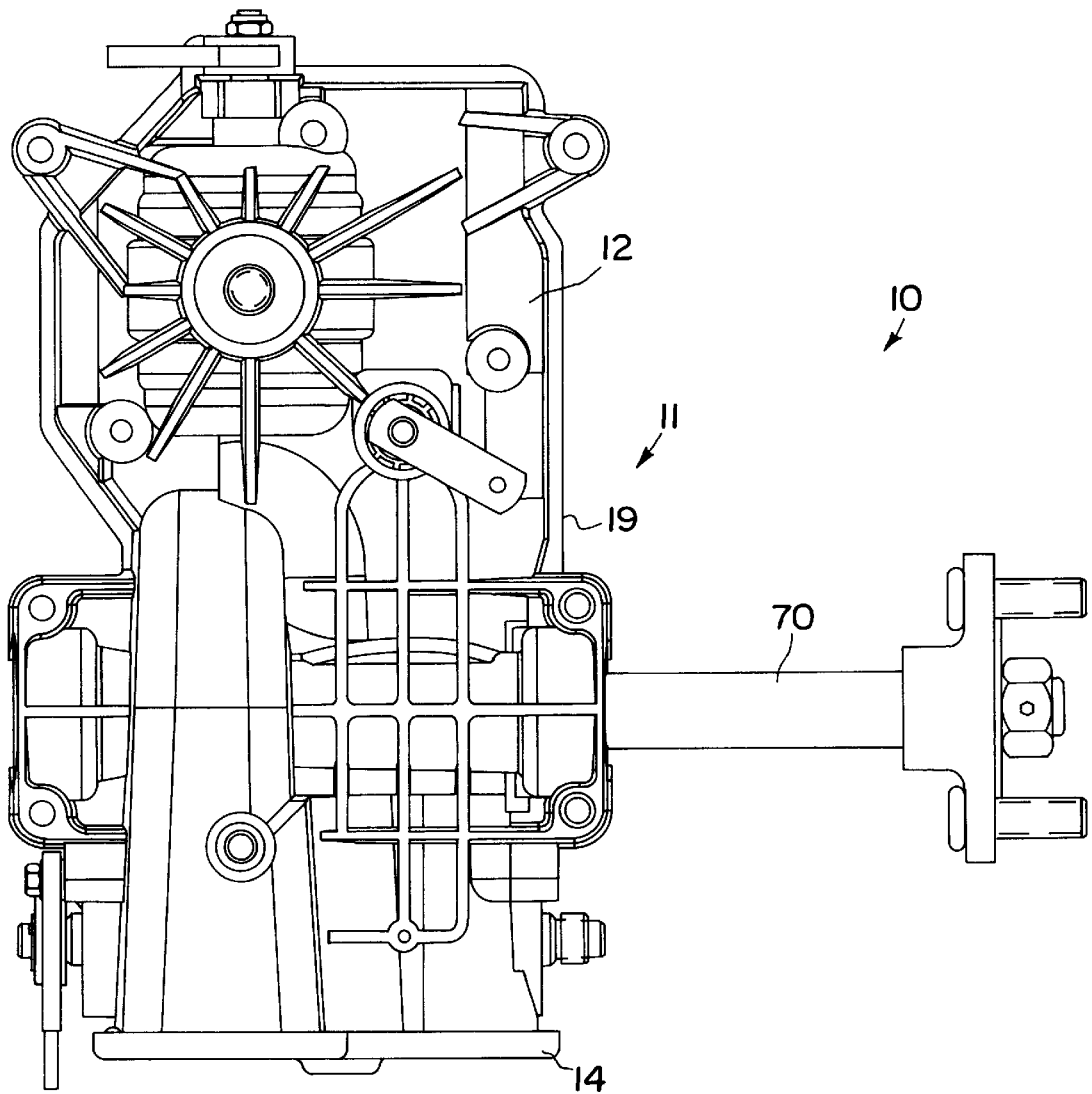
FIG. 5 illustrates a top view of the IHT illustrated in FIG. 2.
Figure 6:
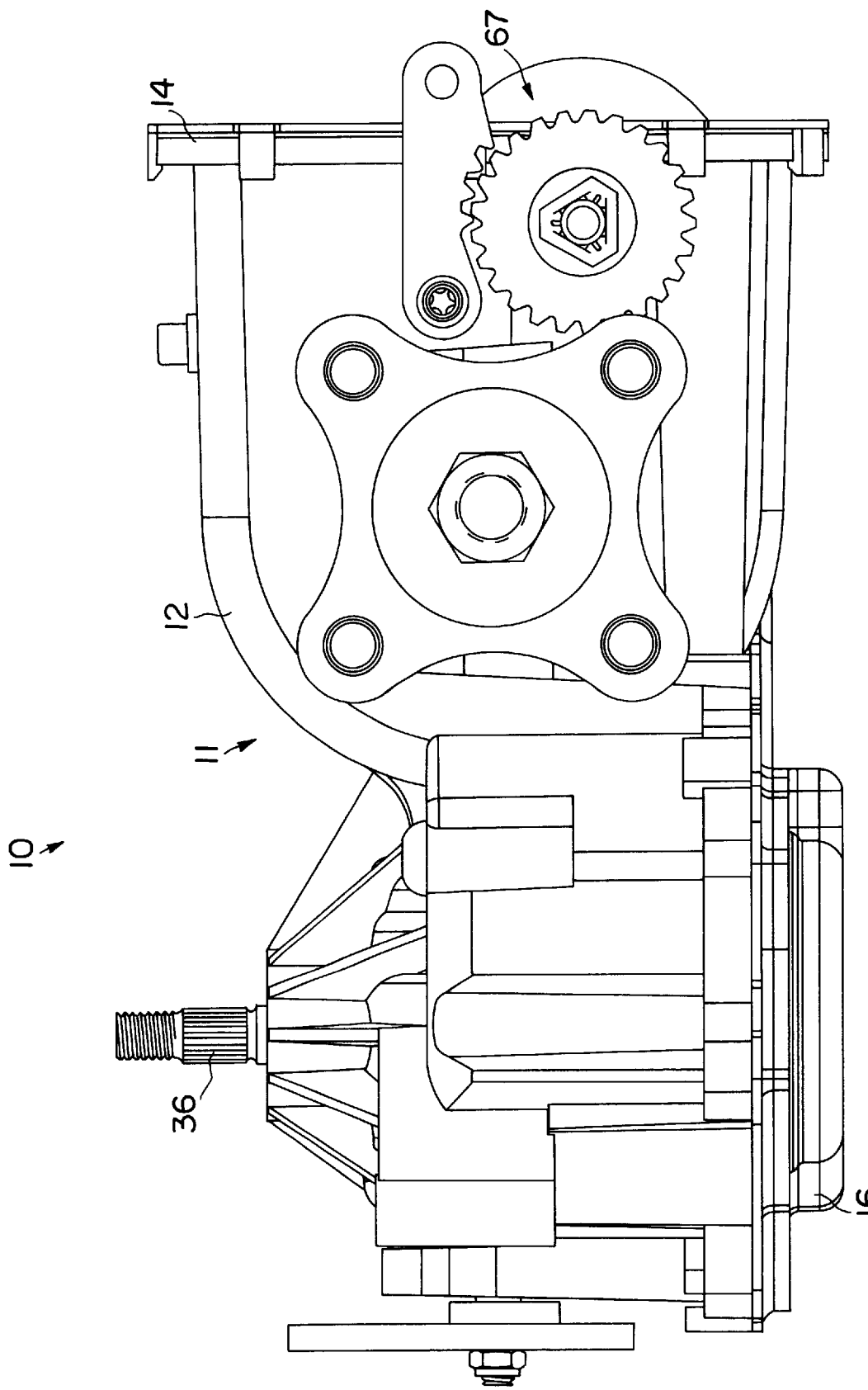
FIG. 6 illustrates a side view of the IHT illustrated in FIG. 1.
Figure 7:
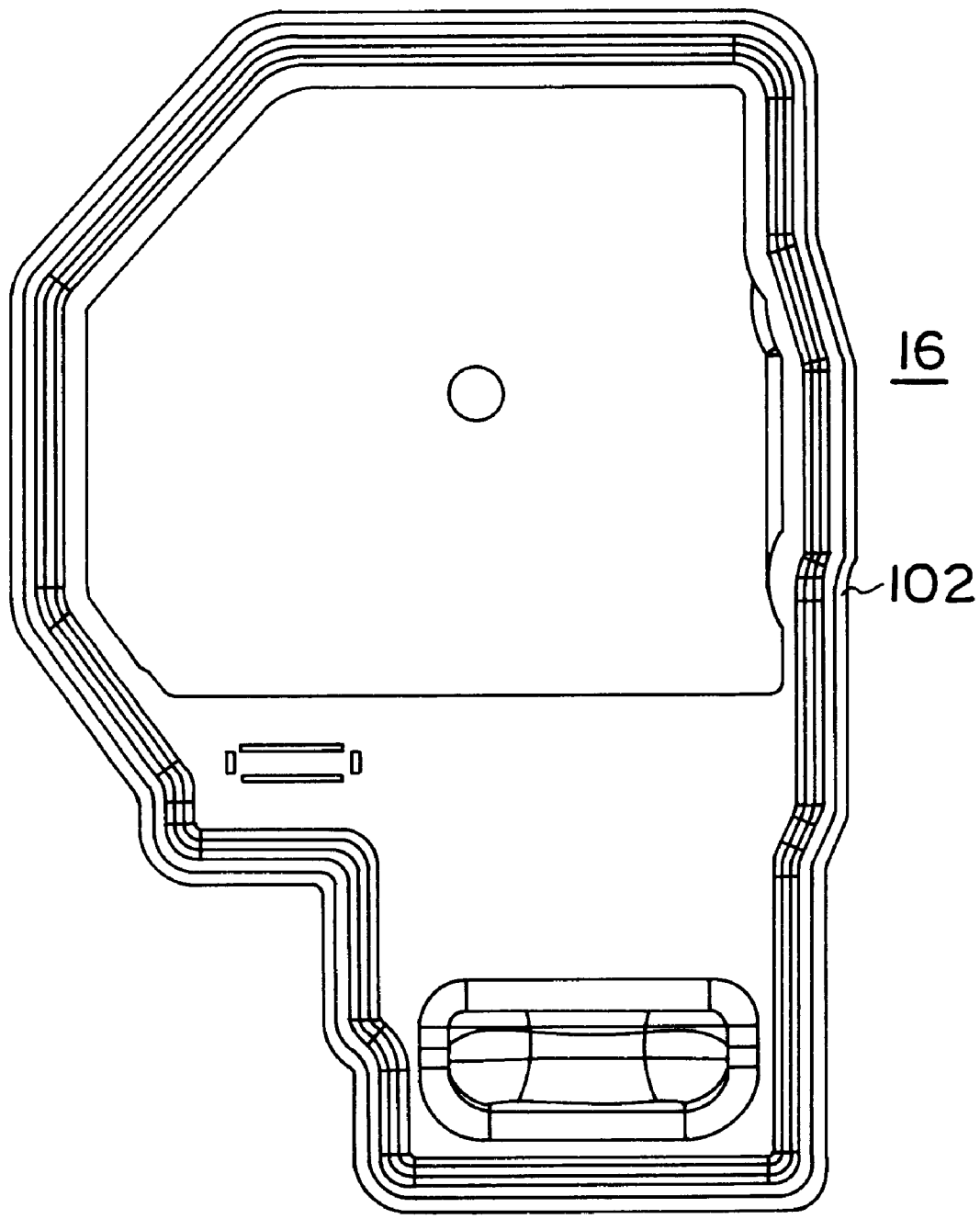
FIG. 7 illustrates a base cap for use in connection with the IHT illustrated in FIGS. 2 and 5.
Figure 9:
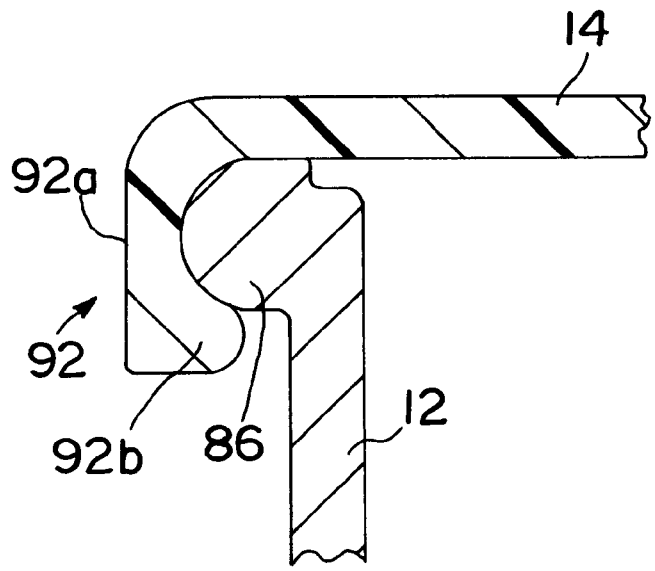
FIG. 9 illustrates a close-up sectional view of a main casing section having an embodiment of the end cap illustrated in FIG. 8 snap fit thereto.
Figure 10:
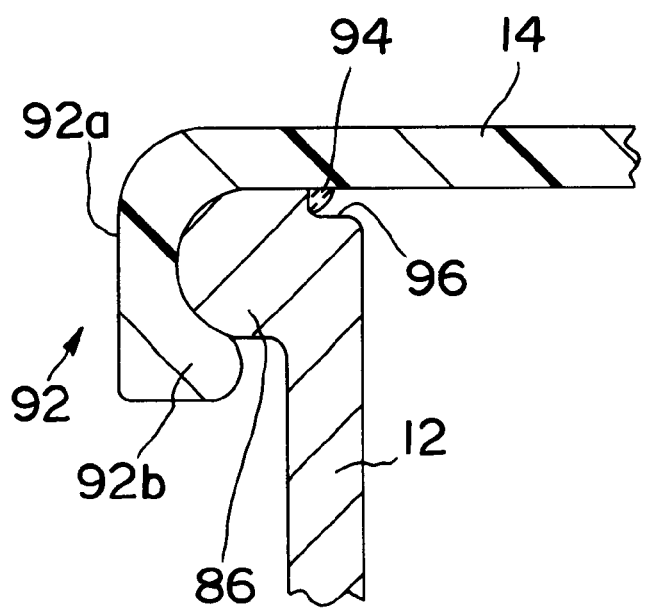
FIG. 10 illustrates a close-up sectional view of an embodiment of the end cap illustrated in FIG. 8 snap fit to a main casing section.
Figure 13:
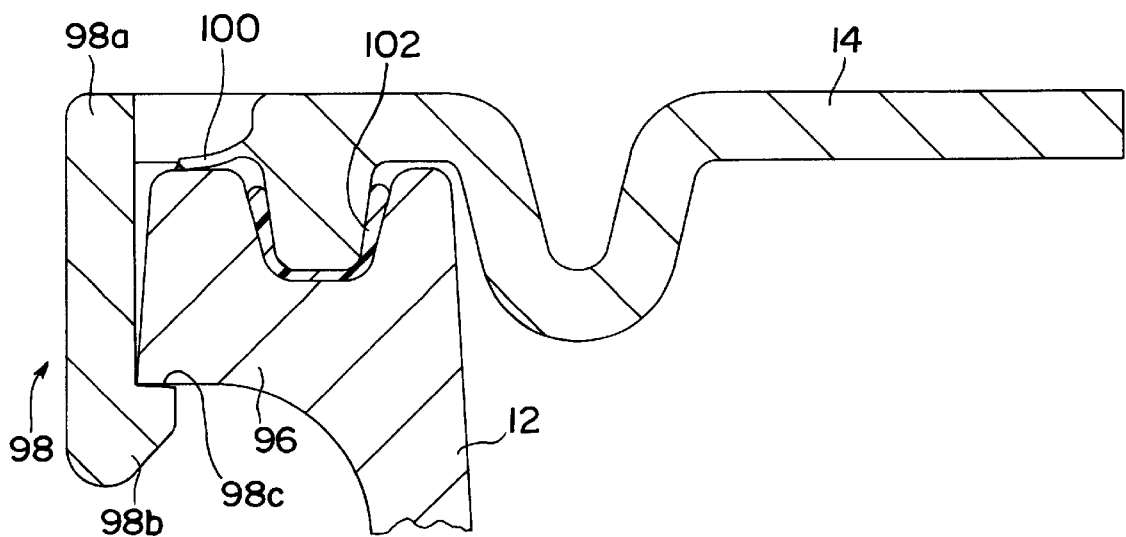
FIG. 13 illustrates a close-up sectional view of an embodiment of the end cap illustrated in FIG. 11 snap fit to a main casing section.

As illustrated in FIGS. 5 and 6, the first and second caps 14, 16 are preferably adapted to be snap fit to the first casing section 12. For this purpose, the first and second caps 14, 16, illustrated in FIGS. 7 and 8, are preferably constructed from a generally resilient material, for example, aluminum, nylon, polypropylene, or the like. However, the use of plastics is preferred in the construction of the first and second caps 14, 16 as the use of such materials is seen to reduce the overall weight of the casing. Furthermore, the use of a transparent or semi-transparent plastic in the construction of the first cap 14 in particular is seen to be advantageous in that it provides a "window" through which the hydraulic fluid level within the casing may be viewed. FIG. 9 depicts end cap 14 formed from plastic material. FIG. 10 depicts the end cap 14 formed from transparent material. FIG. 13 depicts the end cap 14 formed from metal. Additionally, the use of plastics has the advantage of allowing the first and second caps 14,16 to be easily formed in a variety of shapes for the purpose of controlling the volume of the hydraulic fluid within the casing.

In a first embodiment of the subject invention, best seen in FIGS. 9 and 10 and described by way of example with respect to the snap fit between the main casing section 12 and first cap 14, the main casing section 12 is provided with a lip 86 formed around the perimeter of the first opening which leads to the mechanical chamber 46 while the first cap 14 is provided with a resilient lip 92 formed around its perimeter. The resilient lip 92 is adapted to snap fit over the lip 86 to provide a sealing engagement between the main casing section 12 and the first cap 14. In this manner, a "continuous engagement" is formed between the casing components thereby eliminating the deflection problem discussed previously.

Likewise, the surface 19 of the first casing component 12 comprises a second lip 100 around the opening 17. See FIG. 2. The third casing component 16 has a lip 102 adapted to snap fit to the second lip 100. See FIG. 7.

From the foregoing, it will be apparent that a housing first casing component may be snap fitted with a housing second casing component. The "first" casing component may be the main casing component 12. The second casing component may be a cap, such as end cap 14 or base cap 16. If the housing is to include a third casing component, it may also be a cap, such as end cap 14 or base cap 16. In one exemplary embodiment the main casing 12 (first casing component) has a first opening 15 and a second opening 17. Each of the openings has a lip around it. Second and third casing components (or end and base caps, or first and second caps) have lips and are snap fitted to the openings lips. The second casing component lip as a fourth lip. In like fashion, the second casing lip may be referred to as a second lip; the second opening lip has a third lip; and so on. The numerical label is used for convenience and not to limit the structure to specific feature or type of structure, such as "end cap". Where distinction is warranted, distinction has been made.

More specifically, the lip 92 comprises a first section 92a which is adapted to resiliently engage the lip 86 to form the seal therebetween and a second section 92b which is adapted to prevent the inadvertent removal of the lip 92 from the lip 86. To assist in the snap fitting of the first cap 14 to the main casing section 12, it is preferred that the second section 92b of the lip 92 have a curved or ramped surface whereby the lip 92 of the first cap 14 is less likely to bind with the lip 86 of the main casing section 12 as it is being snap fit thereover. Additionally, an optional seal 94, which may be an O-ring, liquid sealant, or the like, may be used between the casing components 12,14 to further enhance the sealing engagement therebetween. For this purpose, an optional notch 96 may be provided in the main casing section 12 proximate to the lip 86 for use in accepting the seal 94. It will be understood that this described arrangement of snap fitting may also be used to allow the second cap 16 to be attached to the main casing section 12.

Figure 11:
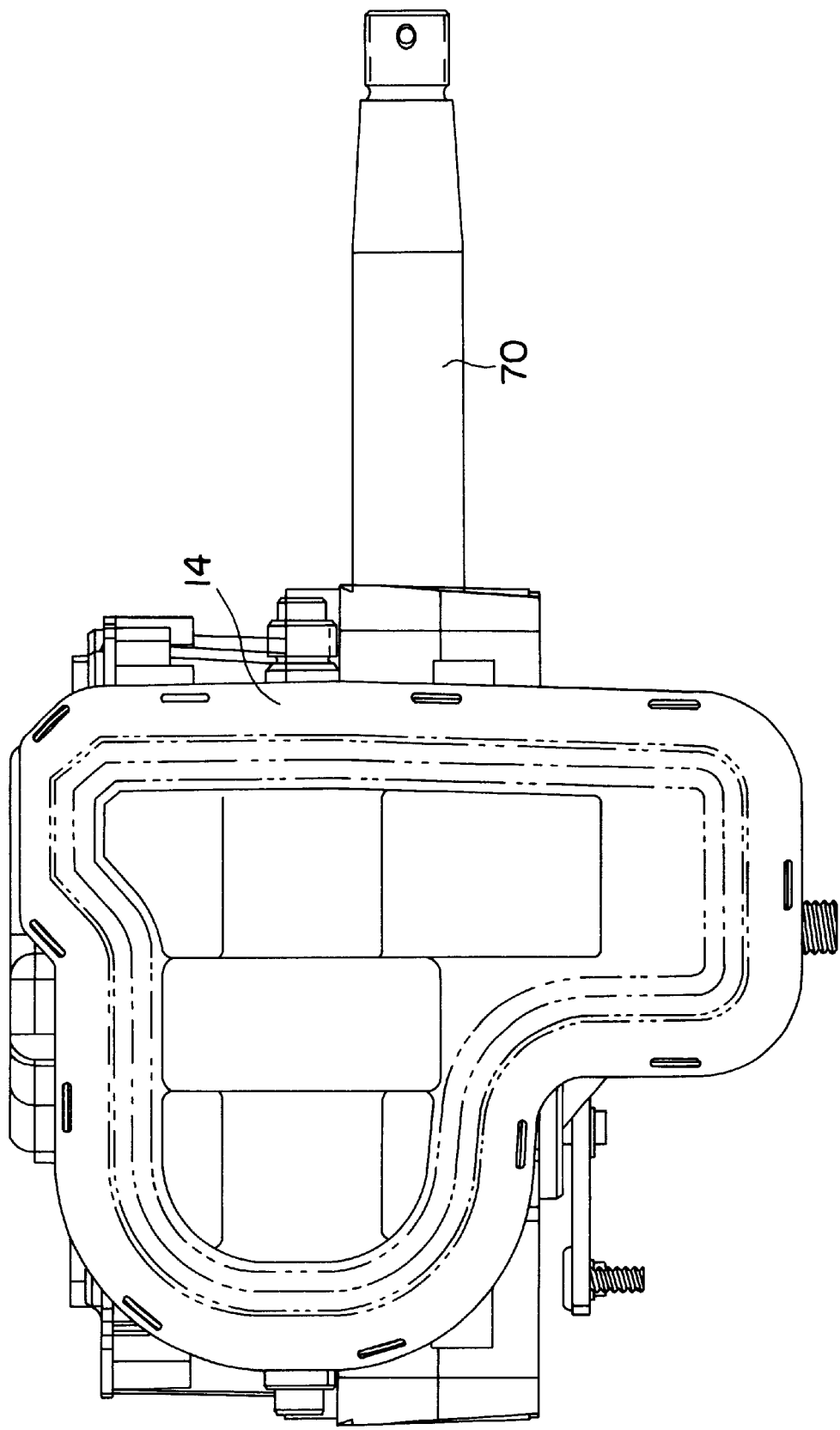
FIG. 11 illustrates a further embodiment of an end cap for use in connection with the IHTs illustrated in FIGS. 1–4.
Figure 12:
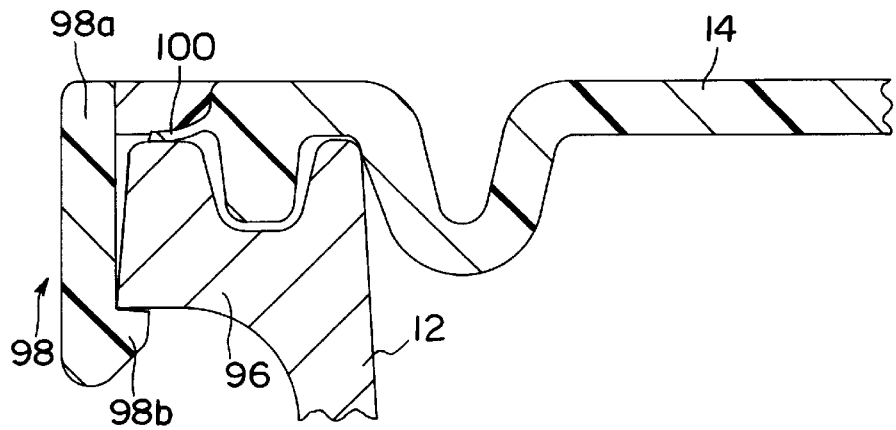
FIG. 12 illustrates a close-up sectional view of an embodiment of the end cap illustrated in FIG. 11 snap fit to a main casing section.

In a second embodiment of the subject invention, best seen in FIGS. 11–13 and described by way of example with respect to the snap fit between the first cap 14 and the main casing section 12, the main casing section 12 is provided with a lip 96 formed around the perimeter of the first opening which leads to the mechanical chamber 46 while the first cap 14 is provided with a plurality of resilient clips 98 formed around its perimeter. The resilient clips 98 are adapted to snap fit over the lip 96 to provide a sealing engagement between the first and second casing sections. As will be understood, as the number of resilient clips 98 utilized in conjunction with the first cap 14 increases the deflection problem discussed previously will be accordingly minimized.

More specifically, in this illustrated embodiment, each of the clips 98 comprise a first section 98a which is adapted to resiliently engage the lip 96 and a second section 98b which is adapted to prevent the inadvertent removal of the clip 98 from the lip 96. A further resilient tab 100 may be provided to the second casing section 14 opposite the second section 98b of the clip 98 to enhance the engagement between the second section 98b of the clip 98 and the lip 96 of the main casing section 12. To assist in the snap fitting of the first cap 14 to the main casing section 12, it is preferred that the second section 98b of the clip 98 have a curved or ramped surface 98c whereby the clip 98 of the fist cap 14 is less likely to bind with the lip 96 of the main casing section 12 as it is being snap fit thereover. In this illustrated embodiment, best seen in FIG. 13, an optional seal 102, which may be an O-ring, liquid sealant, or the like, may be used between the casing components 12, 14 to further enhance the sealing engagement therebetween. It will be understood that this described snap fit arrangement may also be used to allow the second cap 16 to be attached to the main casing section 12.

During operation, the motive force received from the input shaft 36 is transferred via the hydrostatic transmission to the motor shaft 38 in a manner known to those skilled in the art. This motive force is then transferred to the axle shaft 70 from the motor shaft 38 via the drive gears 48,50, brake shaft 52, and bull gear 68. In this manner, a wheel (not illustrated) mounted to the distal end of the axle shaft 70 will be caused to rotate.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A transmission comprising:
   a housing comprising a first casing component, and a second casing component connected to the first casing component to form an interface there between, wherein the interface comprises a snag-fit connection; and
   a hydrostatic transmission disposed within the housing, the transmission comprising a center section on which is disposed a hydraulic pump unit and a hydraulic motor unit.

2. The transmission of claim 1, wherein the interface consists of the snap-fit connection.

3. The transmission of claim 1, wherein the first casing component comprises a surface defining a first opening and a first lip around the first opening; and wherein the second casing component comprises a second lip snap-fitted to the first lip around the first opening.

4. The transmission of claim 1, further comprising a seal connecting the first casing component to the second casing component.

5. The transmission of claim 1, wherein the first casing component is a main casing and the second casing component is an end cap snap-fitted to the main casing to form a substantially vertical junction line therebetween.

6. The transmission of claim 1, wherein the first casing component is a main casing and the second casing component is a base cap snap-fitted to the main casing to form a substantially horizontal junction line therebetween.

7. A transmission comprising:
   a housing including a first casing component and a second casing component snap-fitted to the first casing component; and
   a hydrostatic transmission disposed within the housing, the hydrostatic transmission comprising a center section on which is disposed a hydraulic pump unit and a hydraulic motor unit.

\* \* \* \* \*

UNITED STATES PATENT AND TRADEMARK OFFICE
CERTIFICATE OF CORRECTION

PATENT NO. : 6,105,463
DATED : August 22, 2000
INVENTOR(S) : Ronald Sporrer

It is certified that error appears in the above-identified patent and that said Letters Patent is hereby corrected as shown below:

Column 6,
Line 37, "as" should be -- has --

Column 7,
Line 19, "fist" should be -- first --

Column 8,
Line 9, "snag-fit" should be -- snap-fit --

Signed and Sealed this

Eighteenth Day of December, 2001

Attest:

Attesting Officer

JAMES E. ROGAN
Director of the United States Patent and Trademark Office